Feb. 27, 1951 — W. J. ROSENZWEIG — 2,543,381
WAREHOUSE TRUCK
Filed Sept. 23, 1949 — 2 Sheets-Sheet 1
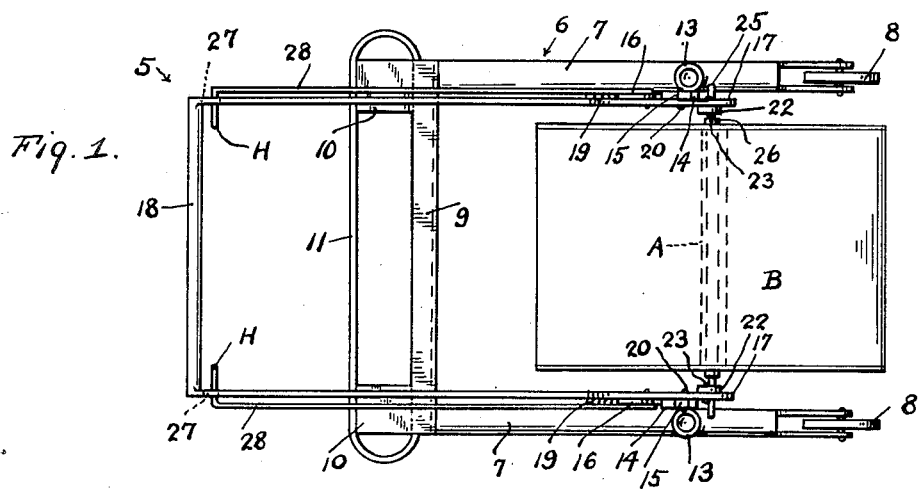
Fig. 1.
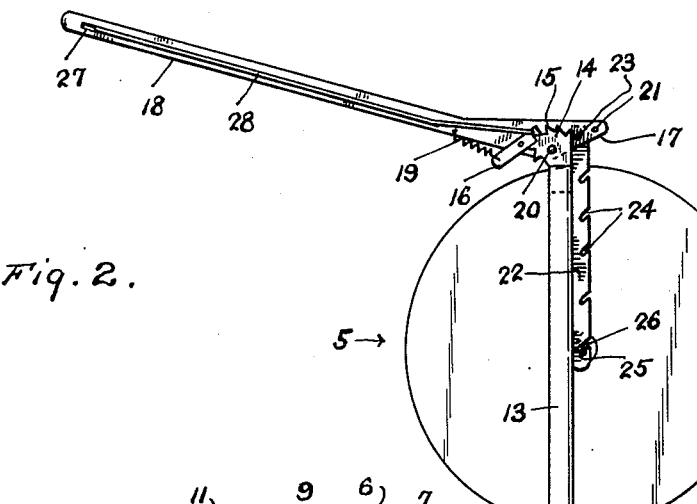
Fig. 2.
Fig. 5.
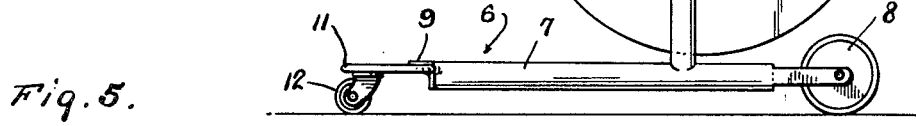
INVENTOR
Walter J. Rosenzweig
BY L. B. James
ATTORNEY Feb. 27, 1951     W. J. ROSENZWEIG     2,543,381
WAREHOUSE TRUCK
Filed Sept. 23, 1949     2 Sheets-Sheet 2
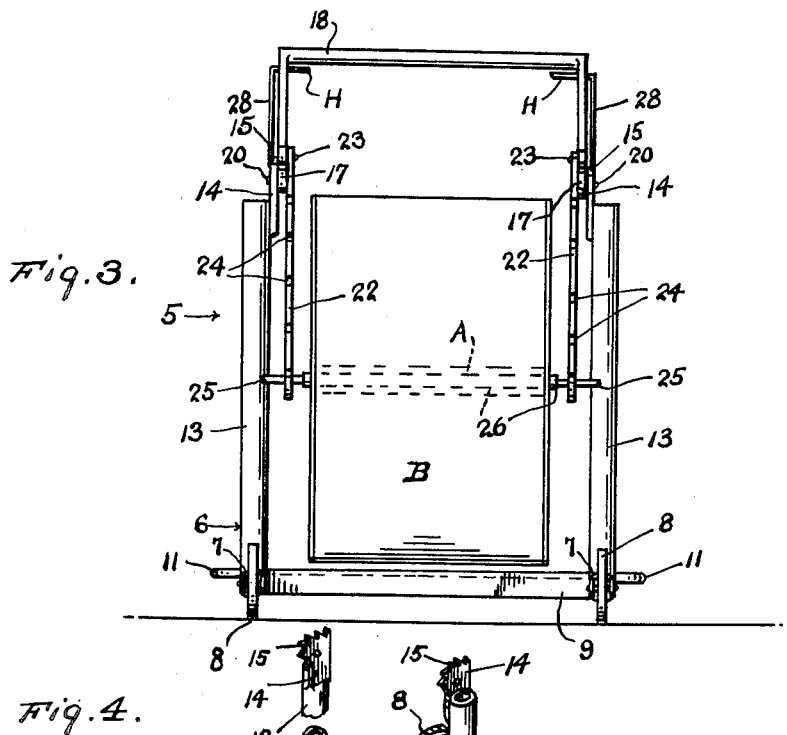
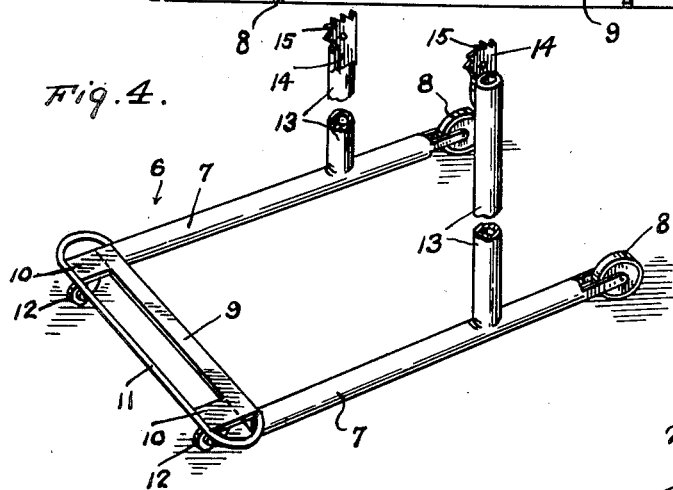
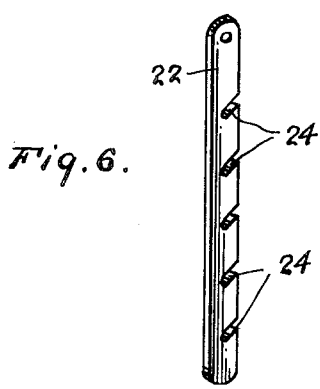
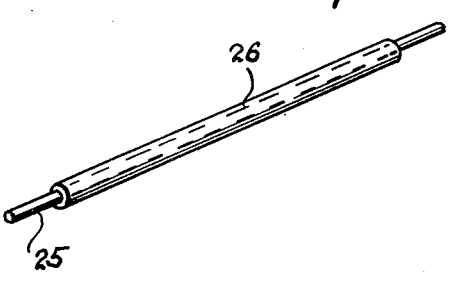
INVENTOR
Walter J. Rosenzweig
BY L. B. James
ATTORNEY Patented Feb. 27, 1951

2,543,381

UNITED STATES PATENT OFFICE 2,543,381

WAREHOUSE TRUCK

Walter J. Rosenzweig, Appleton, Wis.

Application September 23, 1949, Serial No. 117,297

1 Claim. (Cl. 214—65.4)

This invention relates to the official class of material handling and more particularly a new and novel warehouse truck.

The primary object of this invention resides in the provision of a warehouse truck adapted to easily lift and move heavy spools of power belts, wire, cables and the like by a single individual.

Another object of this invention resides in the particular construction of the warehouse truck.

With these and other objects in view, this invention resides in certain novel features of construction and arrangement of elements to be hereinafter more particularly set forth in the specification, illustrated in the accompanying drawings and pointed out in the appended claim and, although this disclosure depicts my present conception of the invention, the right is reserved to resort to such departures therefrom as come within the scope of the claim.

In the accompanying drawings forming a part of this application:

Fig. 1 is a plan view of the warehouse truck.

Fig. 2 is a side view thereof.

Fig. 3 is a front view of the warehouse truck.

Fig. 4 is a perspective view of the base of the warehouse truck.

Fig. 5 is a perspective view of the lever.

Fig. 6 is a perspective view of one of the lifting arms.

Fig. 7 is a perspective view of the spool supporting roller and shaft thereof shown in juxtaposition.

In the present illustration of this invention the numeral 5 designates, in general, a warehouse truck consisting of a substantially U-shaped base 6 having the forward ends of its arm 7 forked to accommodate rubber tire wheels 8 while their rear ends are connected by an angle iron cross beam 9 to opposite ends of which is rigidly secured rearwardly extending arms 10 connected by a brace rod 11 forming a foot rest therebetween.

Journalled beneath the aforesaid arms 10 are rubber tire caster wheels 12 which are preferably smaller in diameter than the wheels 8.

Rigidly secured to the arm 7 of the base preferably adjacent the front ends thereto of are standards 13 having racks 14 rigidly secured to the upper inner sides thereof and provided with ratchet teeth 15 over which dogs 16 pivoted on substantially triangular heads 17 formed on the outer ends of a substantially U-shaped lifting lever 18 operated under the influence of retractile coil springs 19. Said heads 17 are connected to the racks by pivotal bolts 20 or the like and provided with a plurality of apertures 21 in their outer ends of adjustably pivot lifting arms 22 thereon through the instrumentality of bolts 23 or the like. The aforesaid lifting arms are swingably suspended from the heads 17 and provided with upwardly directed notches 24 in their front edges to engage opposite ends of a shaft 25 which supports a roller 26, extending through the axial bore A of a spool B on which is wound material such as a power belt, wire, cable and the like so the same can be lifted and moved from place to place in a warehouse or shop.

Connected to the aforesaid dogs 16 with their outer ends preferably bent at right angles to form handles H which are extended through slots 27 in the outer ends of the lifting lever 18 are manually operated pull rods 28 adapted to permit the operator of the truck to release the dogs so the lifting lever can be manipulated to lower the lifting arms for engagement with the ends of the aforesaid shaft previously extended through the axial bore of a spool of material resting on the floor of a warehouse or shop and also permit the raised spool of material to be lowered and removed from the truck.

With a warehouse truck constructed as heretofore set forth and the aforesaid roller disposed in the axial bore of a spool of material and having the ends of the roller supporting shaft projecting from opposite sides of the spool, the operator of the truck simply rolls the same toward the spool of material while the arms of the base thereof are disposed on opposite sides of the spool and thereafter the dogs are released so the lifting lever can be rocked upwardly to lower the lifting arms until elected notches therein register with and receive opposite ends of the shaft whereupon the lever is rocked downwardly by the operator until the spool of material is raised to the desired height above its support. During raising of the spool the lever is prevented from retroaction by engagement of the dogs with the racks in step by step movement. With the spool thus raised the operator easily and without undue effort is permitted to roll the truck with a heavy spool of material thereon from place to place and unload it therefrom without assistance from other individuals.

Having thus described my invention, what I claim and desire to protect by Letters Patent is:

A warehouse truck adapted to raise and move material wound on spools comprising, a substantially U-shaped base having the front ends of its arms forked and their rear ends connected by an angle iron cross beam, rubber tire wheels journalled in the forked ends of said arms of the base, rearwardly extending arms secured to the angle iron cross beam of the base, rubber tire caster wheels of smaller diameter than the first mentioned wheels secured beneath said arms, a foot resting rod connecting the aforesaid arms and bracing said arms on the cross beam, standards rigidly secured to the arms of the base adjacent the front ends thereof, racks rigidly secured to the upper ends of the standards, a substantially U-shaped lifting lever, substantially triangular heads rigidly secured to the inner ends of the arms of the lifting lever and having a plurality of apertures in their outer ends, means pivotally connecting the heads to the racks, spring operated dogs pivotally mounted on the heads and engaging the teeth of the rack, pull rods connected to the dogs and extending alongside of the arms of the lifting lever, right angular handles formed on the outer ends of said pull rods and slidably extending through slots in the side arms of the lifting lever, lifting arms having upwardly directed notches in their front edges pivotally suspended from elected apertures in the heads of the lifting lever, a shaft removably seated in elected notches of the lifting arms with their outer ends disposed in opposed relation to the front surface of the standards, and a roller mounted on the shaft and supporting a spool of material wound thereon.

WALTER J. ROSENZWEIG.

REFERENCES CITED

The following references are of record in the file of this patent:

UNITED STATES PATENTS

| Number | Name | Date |
|---|---|---|
| 764,344 | Buckelew | July 5, 1904 |
| 1,399,351 | Lee | Dec. 6, 1921 |
| 1,530,014 | Sarff et al. | Mar. 17, 1925 |
| 1,688,650 | Parker | Oct. 23, 1928 |
| 1,728,519 | Tuerck | Sept. 17, 1929 |
| 2,341,350 | Young, Sr. | Feb. 8, 1944 |